United States Patent [19]  [11] 4,411,966
Yamaguchi et al.  [45] Oct. 25, 1983

[54] MAGNETIC RECORDING MEDIUM

[75] Inventors: Nobutaka Yamaguchi; Nobuo Tsuji; Yasutoshi Okuzawa; Norio Nasu; Masaaki Fujiyama, all of Odawara, Japan

[73] Assignee: Fuji Photo Film Co., Ltd., Minami-ashigara, Japan

[21] Appl. No.: 372,686

[22] Filed: Apr. 28, 1982

[30] Foreign Application Priority Data

Apr. 28, 1981 [JP] Japan .................................. 56-63377

[51] Int. Cl.$^3$ .......................... G11B 5/70; H01F 10/02
[52] U.S. Cl. .................................. 428/695; 252/62.54; 360/134; 360/135; 360/136; 427/128; 428/694; 428/900
[58] Field of Search ....................... 428/695, 900, 694; 252/62.54; 427/128; 360/134-136

[56] References Cited

U.S. PATENT DOCUMENTS

| | | | |
|---|---|---|---|
| 4,005,242 | 1/1977 | Kopke et al. | 428/900 |
| 4,110,503 | 8/1978 | Ogawa | 428/900 |
| 4,172,176 | 10/1979 | Tanaka | 428/900 |
| 4,186,228 | 1/1980 | Ogawa et al. | 428/695 |
| 4,322,474 | 3/1982 | Matsuura et al. | 428/411 |

Primary Examiner—Ellis P. Robinson
Attorney, Agent, or Firm—Armstrong, Nikaido, Marmelstein & Kubovcik

[57] ABSTRACT

The present invention relates to an improved magnetic recording medium comprising a magnetic recording layer on the surface of a non-magnetic support, in which the magnetic recording layer contains a fatty acid, high viscosity silicone oil and fatty acid ester.

4 Claims, No Drawings

MAGNETIC RECORDING MEDIUM

BACKGROUND OF THE INVENTION

1. Field of the Invention

This invention relates to an improved magnetic recording medium and more particularly, it is concerned with a magnetic recording medium with excellent properties in head abrasion, head contamination, drop out, still life, etc.

2. Description of the Prior Art

The magnetic layer of a magnetic recording medium comprises generally a magnetic powder, binder resin, lubricant, abrasive, carbon black and other additives and where high density recording is carried out and a higher durability is required as in the case of a video tape, it meets with a number of problems.

Since the magnetic layer of a video tape is contacted with the video head of a VTR at a high speed and rubbed with each other, much abrasion of the video head occurs. Thus, it is required for a user of it to exchange often the video head, but in general, he cannot exchange so often because of being expensive, unlike phonograph needles. From this point, little head abrasion and high head durability have eagerly been desired. However, if head abrasion is decreased in an easy manner, for example, by decreasing the quantity of an abrasive contained in a magnetic layer or by smoothening the surface of a magnetic layer extremely, the durability of the magnetic layer of a tape lowers, the still life is short and a VTR running system, video head or audio head is contaminated by the magnetic layer thus resulting in fade out of image or drop out of sound. When a control head is contaminated, it is difficult to synchronize and the use of a tape is sometimes impossible.

It is well known that when a video tape is used repeatedly, e.g. 100 times, the opposite side of the base to the magnetic layer, i.e. base surface of the video tape is scraped by a pole in a VTR running system and cassette (in the case of a video cassette) and the scraped base powder adheres to a magnetic layer to cause drop out. It is impossible to overcome completely this disadvantage by the present tape/VTR system. As a method of avoiding substantially this disadvantage on the part of the tape, it is proposed to coat the base surface with a durable protective layer, but this results in an increase in cost and where the surface roughness of the protective layer is large, the surface roughness of the magnetic layer is large (pring through) and the video S/N (monochrome and color) is deteriorated.

On the other hand, a long stil life is an essential condition for a video tape in comparison with audio and computer tapes. As well known, in the reproduction of a video tape of sport match, it is required to stop temporarily and view one scene. "Still life" is used as a measure to represent the durability of a magnetic layer, which is determined by contacting only a part of the tape with a video head under severer conditions such that said contacting should be called "grinding". One effective method for strengthening the still life consists in increasing an abrasive in a magnetic layer, but this increases a head abrasion. Since there is a strong contact between a head and a magnetic layer of a tape, if the magnetic layer is simply made hard, head abrasion is increased and if it is made soft, the strength and still life are lowered and it tends to be scraped to contaminate a video head to such an extent that when a normal tape is reproduced, a picture does not appear sometimes.

For the purpose of preventing head abrasion, addition of a lubricant to a magnetic recording medium has commonly been carried out and it is well known that silicone oils have excellent properties as a lubricant. Above all, high viscosity silicone oils such as dimethylpolysiloxanes with a viscosity of 100,000 centistokes have widely been used because of their properties that the viscosity change is small over a wide temperature range and they scarcely move in the coating. As to application of these high viscosity silicone oils to magnetic tapes, there have been proposed (i) a method comprising incorporating a high viscosity silicone oil with a viscosity of at least 100,000 centistokes in a magnetic layer as disclosed in Japanese Patent Application (OPI) No. 77034/1980, (ii) a method comprising blending a magnetic powder, high viscosity silicone oil, higher aliphatic compound and binder to prepare a magnetic recording medium as disclosed in Japanese Patent Application (OPI) No. 8804/1977 and (iii) a method comprising incorporating a higher fatty acid or a higher fatty acid and silicone oil in a magnetic layer containing a magnetic powder as disclosed in Japanese Patent Application (OPI) No. 84082/1980.

However, these methods meet with the following problems: (i) The tape squeak and running property at a high temperature and high humidity are improved and there are provided excellent audio cassette tapes, but in video tapes requiring a higher durability in higher density recording, there take place an increase of drop out and contaminations of a VTR running system and video head. (ii) The friction coefficient at both a low temperature and a high temperature is low, but the head abrasion, head contamination, increase of drop out and still life are not collectively reviewed. In view of the samples of Examples, these four properties are not excellent, as shown in Comparative Samples. (iii) The metallic tapes using an alloy powder containing iron as a magnetic powder has the drawbacks that the head abrasion and drop out are increased and the still life is short, as shown in Comparative Samples.

SUMMARY OF THE INVENTION

It is an object of the present invention to provide a magnetic recording medium whereby the above described drawbacks of the prior art can be overcome.

It is another object of the present invention to provide a magnetic recording medium capable of satisfying simultaneously many requirements as to head abrasion, head contamination, drop out, still life, etc.

It is a further object of the present invention to provide a magnetic recording medium, in particular, video tape suitable for high density recording and with a high durability.

It is a still further object of the present invention to provide a magnetic recording medium with a decreased head abrasion, decreased drop out and long still life.

These objects can be attained by a magnetic recording medium comprising a magnetic recording layer on the surface of a non-magnetic support, in which the magnetic recording layer contains a fatty acid, fatty acid ester and high viscosity silicone oil.

DETAILED DESCRIPTION OF THE INVENTION

In accordance with the present invention, there is provided a magnetic recording medium comprising a magnetic recording layer on the surface of a non-magnetic support, characterised by using, in combination, three specified components of a fatty acid, high viscosity silicone oil and fatty acid ester.

As the fatty acid, there is generally used at least one of saturated or unsaturated fatty acids having 6 to 22 carbon atoms, preferably 12 to 18 carbon atoms in a proportion of 0.1 to 2% by weight, preferably 0.2 to 1.5% by weight, more preferably 0.5 to 1% by weight to the weight of the magnetic powder, since if more than the upper limit, there are bad influences, e.g. contamination of a video head and lowering of the out put due to blooming, while if less than the lower limit, there is little effect according to the present invention. Examples of the fatty acid are capric acid ($C_8$), lauric acid ($C_{12}$), myristic acid ($C_{14}$), oleic acid ($C_{18}$), stearic acid ($C_{18}$), erucic acid ($C_{22}$) and behenic acid ($C_{22}$).

The high viscosity silibone oil is added in a proportion of 0.01 to 1% by weight, preferably 0.05 to 0.75% by weight, more preferably 0.1 to 0.5% by weight to the magnetic powder, since if more than the upper limit, there take place contamination of a video head and deterioration of the still life and in the process of producing a magnetic tape, a support member having a coating, such as polyethylene terephthalate film, waves sometimes to make difficult taking-up, while if less than the lower limit, there is little effect according to the present invention. As the high viscosity silicone oil, there is used at least one of polysiloxanes such as dimethylpolysiloxanes having a viscosity at 25° C. of 5,000 centistokes or more, e.g. represented by commercial names of Shinetsu Silicone KF-96H-6000, KF-96H-10,000 and KF-96H-1,000,000 and Toshiba Silicone Oil TSF-451-3000,000.

As the fatty acid ester, there is generally used at least one of fatty acid esters having a melting point of 60° C. or lower, preferably 40° C. or lower in a proportion of 0.1 to 2% by weight, preferably 0.2 to 1.5% by weight, more preferably 0.5 to 1% by weight to the magnetic powder, since if more than the upper limit, there are bad influences, e.g. contamination of a video head and VTR running system, blooming, abnormal appearance, lowering of the out put, etc., while if less than the lower limit, there is little effect of the present invention. Examples of the fatty acid ester are methyl stearate, amyl stearate, ethyl stearate, butyl stearate, butyl palmitate, butyl myristate, oleyl oleate and butyl laurate.

Production of the magnetic recording medium according to the present invention is carried out in conventional manner by blending the above described three lubricants and other additives such as dispersing agents, abrasives, antistatic agents, etc. with a ferromagnetic fine powder, binder and coating solvent, dispersing, kneading to thus prepare a magnetic coating composition, coating onto a non-magnetic support and then subjecting to a surface finishing treatment.

Addition of the lubricants of the present invention, i.e. fatty acid, high viscosity silicone oil and fatty acid ester to a magnetic layer can be carried out during the step of dispersing or during the step of adding a hardening agent such as a polyisocyanate after dispersing.

Useful examples of the ferromagnetic powder which can be used in the present invention are, for example, $\gamma$-$Fe_2O_3$, Co-doped $\gamma$-$Fe_2O_3$, $Fe_3O_4$, Co-dopes $Fe_3O_4$, Berthollide compounds of $\gamma$-$Fe_2O_3$ and $Fe_3O_4$($FeO_x$; $1.33 < X < 1.50$), Co-doped Berthollide compounds of $\gamma$-$Fe_2O_3$ and $Fe_3O_4$ ($FeO_x$: $1.33 < X < 1.50$), $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972 18573/1972, 10307/1964 and 39639/1973; U.S. Pat. Nos. 3,026,215, 3,031,341, 3,100,194, 3,242,005, 3,389,014; British Pat. Nos. 752,659 and 1,007,323; French Pat. No. 1,107,664 and West German OLS No. 1,281,334.

The ferromagnetic powder has a particle size of about 0.2 to 1 micron in length with a length to width ratio of about 1/1 to 20/1.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, mixtures of high molecular weight polyester resins and isocyanate prepolymers, mixtures of methacrylic acid salt copolymers and diisocyanate prepolymers, mixtures of polyester polyols and polyisocyanates, urea-formaldehyde resins, mixtures of low molecular weight glycols, high molecular weight diols and triphenylmethane triisocyanates, polyamine resins and mixtures thereof. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos.

3,144,353, 3,320,090, 3,437,510, 3,597,273, 3,781,210, 3,781,211, etc.

These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, myristic acid, plamitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in addition to the foregoing lubricants according to the invention include carbon black, graphite, carbon black graft polymers, molybdenum disulfide and tungsten disulfide.

Typical abrasive agents which can be used in the present invention include fused alumina, silicon carbide, chromium oxide, corundum, synthetic corundum, diamond, synthetic diamond, garnet, emery (main component: corundum and magnetite) and the like. These abrasive agents have generally a mean particle size of 0.05 to 5 microns, preferably 0.1 to 2 microns and are generally added in a proportion of 1 to 10 parts by weight to 100 parts by weight of the magnetic powder. Examples of the abrasives are described in Japanese Patent Application No. 26749/1973, U.S. Pat. Nos. 3,007,807, 3,041,196, 3,293,066, 3,630,910 and 3,687,725; British Pat. No. 1,145,349; and West German Pat. Nos. 853,211 and 1,001,000.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as higher alkylamines, quaternary ammonium salts, heterocyclic compounds, e.g. pyridine and the like; phosphoniums, sulfoniums and the like; anionic surface active agents containing acid groups such as carboxylic acid groups, sulfonic acid groups, phosphoric acid groups, sulfate groups, phosphate groups and the like; and amphoteric surface active agents such as aulfates or phosphates of amino acids, aminosulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to sono Oyo" (Synthesis of Surface Active Agents and Their Applications), Maki Shoten, Tokyo (1964), A. M. Schwarts et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran" (Handbook of Surface Active Agents), 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving the dispersibility, magnetic properties and lubricity, or as an auxiliary coating agent.

Formation of a magnetic recording layer is carried out by dissolving the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc., and non-magnetic metals, for example, copper, aluminum, zinc, etc.

Such a non-magnetic support has a thickness of about 3 to 100 microns, preferably 5 to 50 microns in the form of a film or sheet and a thickness of about 0.5 to 10 microns in the form of a disk or card. In the case of a drum form, its type is determined according to a recorder to be used.

The above described magnetic powder, binder, additives and solvent are well blended or kneaded to prepare a magnetic coating composition. For kneading, the magnetic powder and other components are charged in a kneading machine simultaneously or separately. For example, a magnetic powder is added to a solvent containing a dispersing agents, kneaded for a predetermined period of time, then mixed with other components and kneaded sufficiently to prepare a magnetic coating composition.

Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in "Coating Kogaku" (Coating Engineering), page 253 to 277, published by Asakura Shoten, Tokyo (Mar. 20, 1971).

Typical organic solvents which can be used in the coating include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene, and the like; chlorinated hydrocarbons such as methylene chloride, ethylene chloride, carbon tetrachloride, chloroform, ethylene chlorohydrin, dichlorobenzene and the like; etc.

The present invention will be explained in detail with reference to the following examples. It will be obvious to one skilled in the art that various changes and modifications can be made in components, ratios, operational order and the like without departing from the spirit of the present invention. Therefore, the present invention should not be construed as being limited to the following examples.

EXAMPLE 1

The following composition (I) was roughly dispersed (dissolved) in a stirrer, subjected to a dispersing treatment using glass beads of 1.3 mmφ in a sand grinder and then mixed with the following composition (II) in a stirrer to obtain a magnetic liquid. After filtering, the resulting liquid was coated onto a polyethylene terephthalate base with a thickness of 20 microns to give a coating of 6 microns on dry base, followed by drying. During the coating, the magnetic substance was subjected to an orientation treatment in the longitudinal direction by a solenoid. After the passage of 30 minutes from the coating, the magnetic substance was subjected to a surface finishing treatment using a super calender to make the coating surface mirror-like and then slit to obtain a magnetic tape of ¾ inch in width, which was subjected to assessment of various properties using a ¾ inch U-matic VTR. The other steps were similar to those of the usual process for preparing magnetic tapes. Sample No. 1 was thus obtained.

| | parts by weight |
|---|---|
| Composition (I) | |
| Co-doped γ-Fe₂O₃ (Hc = 559 Oe) | 100 |
| Vinyl Chloride/Vinyl Acetate/Vinyl Alcohol Copolymer | 10 |
| Polyurethane Resin | 5 |
| Carbon Black | 7 |
| Cr₂O₃ | 2 |
| Fatty Acid Ester (Butyl Stearate made by Nippon Yushi Co.) | 1 |
| Fatty Acid (NAA-173K-commercial name-Stearic Acid made by Nippon Yushi Co.) | 1 |
| High Viscosity Silicone Oil (Silicone KF-96H-1,000,000 CS,-commercial name-made by Shinetsu Kagaku Co.) | 0.3 |
| Methyl Ethyl Ketone | 100 |
| Butyl Acetate | 50 |
| Composition (II) | |
| Polyisocyanate | 5 |
| Methyl Ethyl Ketone | 20 |

The above described procedure was repeated except changing the amounts of the butyl stearate, stearic acid and high viscosity silicone oil as shown in Table 1, thus obtaining Sample Nos. 2 to 8.

TABLE 1

| | Butyl Stearate parts by wt. | Stearic Acid parts by wt. | High Viscosity Silicone Oil parts by wt. |
|---|---|---|---|
| Sample No. 2 | 1 | 0 | 0 |
| 3 | 0 | 1 | 0 |
| 4 | 0 | 0 | 0.3 |
| 5 | 1 | 1 | 0 |
| 6 | 1 | 0 | 0.3 |
| 7 | 0 | 1 | 0.3 |
| 8 | 0 | 0 | 0 |

Assessment of these samples was carried out as to a tape of 358 m in length (one hour length) using a ¾ inch U-matic VTR. The head abrasion was measured by running the tape at normal temperature for 100 hours and determining the heights of a video head before and after running. The increase of drop out out was measured by determining the difference (increase) of numbers of drop outs per one minute of a video tape before and after running 50 times. The still life was measured by setting a VTR in still state and determining a time (min) until an image disappeared. When the time was longer than 120 minutes, the measurement was stopped at that time. The results of the assessments are shown in Table 2:

TABLE 2

| Sample No. | Butyl Stearate | Stearic Acid | High Viscosity Silicone Oil | Head Abrasion (μm/100 hr) | Drop Out Increased per min. | Still Life (min) |
|---|---|---|---|---|---|---|
| 1* | 1 | 1 | 0.3 | 2 | 0 | 120< |
| 2** | 1 | 0 | 0 | 5 | 25 | 60 |
| 3** | 0 | 1 | 0 | 4.5 (somewhat contaminated) | 15 | 5 |
| 4** | 0 | 0 | 0.3 | 2 | 17 | 5 |
| 5** | 1 | 1 | 0 | 6 | 14 | 100 |
| 6** | 1 | 0 | 0.3 | 2 | 85 | 90 |
| 7** | 0 | 1 | 0.3 | 2 | 10 | 10 |
| 8** | 0 | 0 | 0 | 10 (contaminated) | 100< | 5> (contamination of head) |

Note
*Present Invention
**Comparative Example

As can be seen in Table 2, Sample No. 1 according to the present invention has excellent properties, i.e. little head abrasion, little head contamination, decreased drop out and long still life. As to the still life, measurement of it was stopped in 120 minutes sufficient on practical use, but it is assumed that Sample No. 1 has a still life of 150 to 200 minutes or more. On the contrary, Sample Nos. 2 to 8 lacking any one of the three lubricants do not satisfy the requirements as to head abrasion, head contamination, increase of drop out and drop out.

EXAMPLE 2

In order to prove that the combination of the present invention has more excellent effects than the other combination suggested by the prior art (Japanese Patent Publication No. 10688/1981), similar samples to Example 1 were prepared and comparted to obtain results shown in Table 3:

TABLE 3

| Sample No. | Butyl Stearate (wt part) | Stearic Acid (wt part) | High Viscosity Silicone Oil (wt part) | Other Additive (wt part) | Head Abrasion (μmm/100 hr) | Drop Out Increased per min | Still Life (min) |
|---|---|---|---|---|---|---|---|
| 1 | 1 | 1 | 0.3 | — | 2 | 0 | 120< |
| 9** | 0 | 0 | 0.3 | (a) 1 | 3.5*** | 50 | 5> |
| 10** | 0 | 0 | 0.3 | (b) 1 | 5*** | 65 | 5> |
| 11** | 0 | 1 | 0.3 | (a) 1 | 5**** | 9 | 5> |
| 12** | 0 | 1 | 0.3 | (b) 1 | 6.5**** | 12 | 5> |
| 13** | 1 | 0 | 0.3 | (a) 1 | 3 | 45 | 40 |
| 14 | 1 | 0 | 0.3 | (b) 1 | 4 | 70 | 30 |

Note
*Present Invention
**Comparative Example
***Head was somewhat contaminated.
****Head was contaminated.
(a) Oleic Acid Amide
(b) Stearyl Alcohol

EXAMPLE 3

The procedure of Example 1 was repeated except using (i)oleyl oleate in place of the butyl stearate, (ii) myristic acid in place of the stearic acid, (iii) 0.3 part by weight of butyl stearate, (iv) 2 parts by weight of butyl stearate, (v) 0.3 part by weight of stearic acid and (vi) 2 parts by weight of stearic acid, thus obtaining respectively Sample Nos. 15 to 20. Assessment of these samples was carried out in an analogus manner to Example 1 to obtain results shown in Table 4:

TABLE 4

| Sample No. | Fatty Acid Ester | Fatty Acid | High Viscosity Silicone Oil | Head Abrasion (μm/100 hr) | Drop Out Increased per min. | Still Life (min) |
|---|---|---|---|---|---|---|
| 1* | 1 | 1 | 0.3 | 2 | 0 | 120< |
| 15* | 1 | 1 | 0.3 | 2 | 0 | 120< |
| 16* | 1 | 1 | 0.3 | 2 | 0 | 120< |
| 17* | 0.3 | 1 | 0.3 | 2 | 0 | 100 |
| 18* | 2 | 1 | 0.3 | 2.5 | 0 | 120< |
| 19* | 1 | 0.3 | 0.3 | 2 | 3 | 120< |
| 20* | 1 | 1 | 0.3 | 2.5 | 0 | 120< |

Note
*Present Invention

What is claimed is:

1. A magnetic recording medium comprising a magnetic recording layer on the surface of a non-magnetic support, the magnetic recording layer comprising a ferromagnetic powder, 0.1 to 2% by weight based on the weight of the ferromagnetic powder of a saturated or unsaturated fatty acid having 6 to 22 carbon atoms, 0.01 to 1% by weight based on the weight of the ferromagnetic powder of a polysiloxane and 0.1 to 2% by weight based on the weight of the ferromagnetic powder of a fatty acid ester having a melting point of at most 60° C.

2. The magnetic recording medium of claim 1, wherein the saturated or unsaturated fatty acid is selected from the group consisting of capric acid, lauric acid, myristic acid, oleic acid, stearic acid, erucic acid and behenic acid.

3. The magnetic recording medium of claim 1, wherein the magnetic recording layer contains a ferromagnetic powder selected from the group consisting of fine powders of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$, Co-doped Berthollide compounds of $\gamma$-$Fe_2O_3$ and $Fe_3O_4$, $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

4. The magnetic recording medium of claim 1, wherein the fatty acid ester having a melting point of at most 60° C. is selected from the group consisting of methyl stearate, ethyl stearate, butyl stearate, amyl stearate, butyl palminate, butyl mysistate, oleyl oleate and butyl laurate.

* * * * *